United States Patent
Morrison et al.

(10) Patent No.: US 6,522,772 B1
(45) Date of Patent: Feb. 18, 2003

(54) SELF-SERVICE CHECKOUT TERMINAL HAVING A BIOMETRIC SENSING DEVICE FOR VERIFYING IDENTITY OF A USER AND ASSOCIATED METHOD

(75) Inventors: James Morrison, Suwanee, GA (US); John C. Addy, Lawrenceville, GA (US)

(73) Assignee: NCR Corporation, Dayton, OH (US)

( * ) Notice: Subject to any disclaimer, the term of this patent is extended or adjusted under 35 U.S.C. 154(b) by 370 days.

(21) Appl. No.: 09/164,098

(22) Filed: Sep. 30, 1998

(51) Int. Cl.$^7$ ................................................. G06K 9/00
(52) U.S. Cl. .......................... 382/124; 235/383; 705/23
(58) Field of Search .............................. 382/115, 116, 382/117, 118, 124, 125; 235/375, 383, 462.01; 705/14, 10, 23; 713/182, 184, 186; 186/59, 61

(56) References Cited

U.S. PATENT DOCUMENTS

| | | | |
|---|---|---|---|
| 4,179,064 A | 12/1979 | Yoshioka et al. | 235/381 |
| 4,529,870 A | 7/1985 | Chaum | 235/380 |
| 4,641,349 A * | 2/1987 | Flom et al. | 382/117 |
| 4,821,118 A | 4/1989 | Lafreniere | 358/108 |
| 4,993,068 A * | 2/1991 | Piosenka et al. | 713/186 |
| 5,067,162 A | 11/1991 | Driscoll, Jr. et al. | 382/5 |
| 5,337,358 A | 8/1994 | Axelrod et al. | 380/23 |
| 5,339,250 A | 8/1994 | Durbin | 364/479 |
| 5,386,104 A | 1/1995 | Sime | 235/379 |
| 5,432,864 A | 7/1995 | Lu et al. | 382/118 |
| 5,469,506 A | 11/1995 | Berson et al. | 380/23 |
| 5,482,139 A | 1/1996 | Rivalto | 186/36 |
| 5,483,601 A | 1/1996 | Faulkner | 382/115 |
| 5,559,313 A | 9/1996 | Claus et al. | 235/380 |
| 5,566,327 A | 10/1996 | Sehr | 395/600 |
| 5,715,325 A * | 2/1998 | Bang et al. | 382/118 |
| 5,761,329 A * | 6/1998 | Chen et al. | 382/118 |
| 5,923,735 A * | 7/1999 | Swartz et al. | 379/93.12 |
| 5,979,757 A * | 11/1999 | Tracy et al. | 235/383 |

OTHER PUBLICATIONS

Portable self checkout retail system, IBM Technical Disclosure Bulletin, vol. 35, 1A, pp. 315–318, Jun. 1992.*

* cited by examiner

*Primary Examiner*—Samir Ahmed
*Assistant Examiner*—Vikkram Bali
(74) *Attorney, Agent, or Firm*—Maginot, Moore & Bowman LLP

(57) ABSTRACT

A self-service checkout terminal includes an input device for receiving a user reported identity code associated with a user of the checkout terminal and a biometric sensing device for detecting a biometric characteristic of the user. The self-service checkout terminal also includes a processing unit electrically coupled to both the input device and the biometric sensing device. Moreover, the self-service checkout terminal includes a memory device electrically coupled to the processing unit. The memory device has stored therein a plurality of instructions which, when executed by the processing unit, causes the processing unit to (i) retrieve a user biometric profile which corresponds to the user reported identity code, (ii) detect if the user enters a restricted item into the checkout terminal and generate a restricted-item control signal in response thereto, and (iii) compare the user biometric profile with the biometric characteristic and generate an identity-verified control signal if the user biometric profile matches the biometric characteristic. A method of operating a self-service checkout terminal is also disclosed.

20 Claims, 5 Drawing Sheets

SELF-SERVICE CHECKOUT TERMINAL HAVING A BIOMETRIC SENSING DEVICE FOR VERIFYING IDENTITY OF A USER AND ASSOCIATED METHOD

TECHNICAL FIELD OF THE INVENTION

The present invention relates generally to a retail checkout terminal, and more particularly to a self-service checkout terminal having a biometric sensing device for verifying identity of a user and associated method.

BACKGROUND OF THE INVENTION

In the retail industry, the largest expenditures are typically the cost of the goods sold followed closely by the cost of labor expended. With particular regard to the retail grocery or supermarket industry, the impetus to reduce labor costs has focused on reducing or eliminating the amount of time required to handle and/or process the items or goods to be purchased by a customer. To this end, there have been a number of self-service checkout terminal concepts developed which attempt to substantially eliminate the need for a checkout clerk.

A self-service checkout terminal is a system which is operated by a customer without the aid of a checkout clerk. In such a system, the customer scans individual items for purchase across a scanner and then places the scanned items into a grocery bag, if desired. The customer then pays for his or her purchases either at the self-service checkout terminal if so equipped, or at a central payment area which is staffed by a store employee. Thus, a self-service checkout terminal permits a customer to select, itemize, and in some cases pay for his or her purchases without the assistance of the retailer's personnel.

However, during operation of the self-service checkout terminal, the customer may enter an item which requires verification of certain characteristics of the customer. In particular, the customer's items for purchase may include restricted items which by law or otherwise require verification of certain characteristics of the customer. For example, if the customer's items for purchase include restricted items such as tobacco products, alcoholic beverages, or certain solvents, the customer's age may have to be verified prior to the sale thereof.

Typically, the verification of such characteristics (i.e. age) requires intervention into the customer's transaction by a store employee such as a customer service manager. In particular, when the customer enters a restricted item into the self-service checkout terminal, the customer service manager is notified via either a flashing light or an audible sound that intervention is needed prior to completion of the customer's transaction. Hence, prior to completing the customer's transaction, the customer service manager must approach the customer and verify the customer's age by, for example, checking the customer's driver's license or other form of identification.

Such intervention has a number of drawbacks associated therewith. For example, the retailer must always have an employee (e.g. the customer service manager) present during operation of the self-service checkout terminal in order to verify the age of a customer upon entry of a restricted item. Such a requirement increases labor costs associated with the retailer's operation. Moreover, the requirement of such intervention may be inconvenient to the retailer's customers. In particular, if a customer has completed entering his or her items for purchase, tendered payment therefor, and is ready to exit the store, the customer may be undesirably inconvenienced if the customer must wait for the customer service manager to approach the self-service checkout terminal in order to verify his or her age prior to exiting the store. Moreover, such a requirement reduces the throughput associated with the self-service checkout terminal. In particular, if the customer is otherwise finished with operation of the self-service checkout terminal, but must wait for the customer service manager to approach the self-service checkout terminal, the customer is undesirably forced to remain at the terminal thereby reducing the number of customers which may checkout their items for purchase via use of the terminal over a given period of time (i.e. reduces throughput though the self-service terminal).

What is needed therefore is a self-service checkout terminal which overcomes one or more of the above-mentioned drawbacks. What is particularly needed is a self-service checkout terminal which reduces the number of occasions in which an employee of the retailer must intervene in the customer's transaction relative to self-service checkout terminals which have heretofore been designed. What is also needed is a self-service checkout terminal which allows a customer to enter a restricted item into the terminal without requiring intervention by store personnel.

SUMMARY OF THE INVENTION

In accordance with a first embodiment of the present invention, there is provided a method of operating a self-service checkout terminal. The method includes the step of determining a user reported identity code associated with a user of the checkout terminal and retrieving a user biometric profile which corresponds to the user reported identity code in response thereto. The method also includes the step of detecting if the user enters a restricted item into the checkout terminal and generating a restricted-item control signal in response thereto. The method further includes the step of detecting a biometric characteristic of the user in response to generation of the restricted-item control signal. The method moreover includes the step of comparing the user biometric profile with the biometric characteristic and generating an identity-verified control signal if the user biometric profile matches the biometric characteristic.

In accordance with a second embodiment of the present invention, there is provided a self-service checkout terminal. The self-service checkout terminal includes an input device for receiving a user reported identity code associated with a user of the checkout terminal and a biometric sensing device for detecting a biometric characteristic of the user. The self-service checkout terminal also includes a processing unit electrically coupled to both the input device and the biometric sensing device. Moreover, the self-service checkout terminal includes a memory device electrically coupled to the processing unit. The memory device has stored therein a plurality of instructions which, when executed by the processing unit, causes the processing unit to (i) retrieve a user biometric profile which corresponds to the user reported identity code, (ii) detect if the user enters a restricted item into the checkout terminal and generate a restricted-item control signal in response thereto, and (iii) compare the user biometric profile with the biometric characteristic and generate an identity-verified control signal if the user biometric profile matches the biometric characteristic.

In accordance with a third embodiment of the present invention, there is provided a self-service checkout terminal. The self-service checkout terminal includes a scanner for reading bar codes associated with a user's items for purchase and a product scale for weighing a number of the user's items for purchase. The self-service checkout terminal also includes an input device for receiving a user reported identity code associated with the user and a biometric sensing device for detecting a biometric characteristic of the user. The self-service checkout terminal further includes a processing unit electrically coupled to each of the scanner, the product scale, the input device, and the biometric sensing device. Moreover, the processing unit includes a memory device electrically coupled to the processing unit. The memory device has stored therein a plurality of instructions which, when executed by the processing unit, causes the processing unit to (i) retrieve a user biometric profile which corresponds to the user reported identity code, and (iii) compare the user biometric profile with the biometric characteristic and generate an identity-verified control signal if the user biometric profile matches the biometric characteristic.

It is therefore an object of the present invention to provide a new and useful self-service checkout terminal.

It is moreover an object of the present invention to provide an improved self-service checkout terminal.

It is a further object of the present invention to provide a new and useful method of operating a self-service checkout terminal.

It is also an object of the present invention to provide an improved method of operating a self-service checkout terminal.

It is yet another object of the present invention to provide a self-service checkout terminal which reduces the number of occasions in which an employee of the retailer must intervene in the customer's transaction relative to self-service checkout terminals which have heretofore been designed.

It is also an object of the present invention to provide a self-service checkout terminal which allows a customer to enter a restricted item into the terminal without requiring intervention by store personnel.

The above and other objects, features, and advantages of the present invention will become apparent from the following description and the attached drawings.

DETAILED DESCRIPTION OF THE INVENTION

Figure 1:
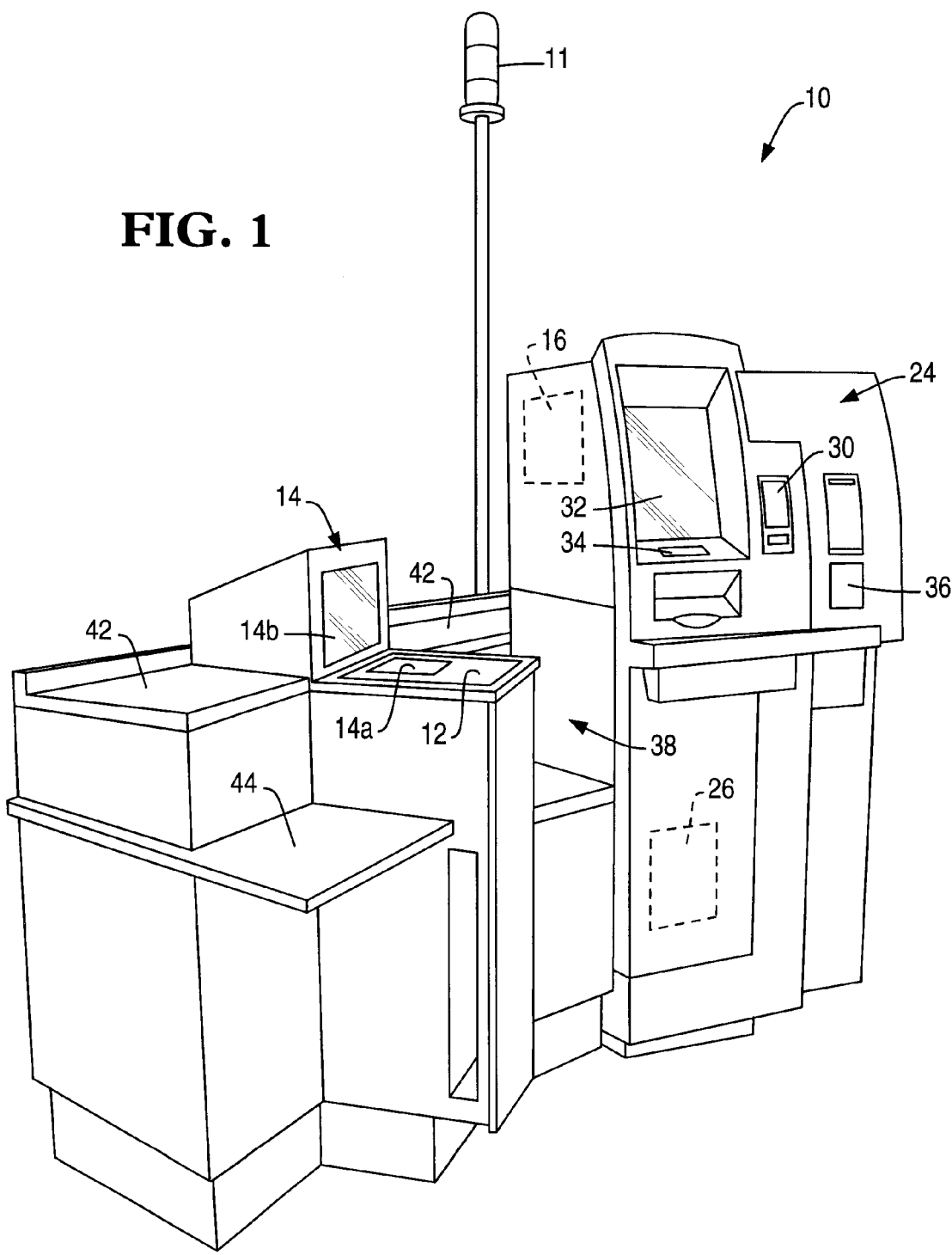
FIG. 1 is a perspective view of a self-service checkout terminal which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the appended claims.

Referring now to FIG. 1, there is shown a self-service checkout terminal 10 for use in a retail business such as a grocery store. The self-service checkout terminal 10 includes a status light device 11, a product scale 12, a scanner 14, a biometric sensing device 16, a card reader 30, a display monitor 32, a keypad 34, a printer 36, and a processing unit 26. The card reader 30, the display monitor 32, the keypad 34, and the printer 36 may be provided as separate components, or alternatively may preferably be provided as components of an automated teller machine (ATM) 24.

The biometric sensing device 16 is provided to detect a number of biometric characteristics associated with a user or customer of the self-service checkout terminal 10. What is meant herein by the term "biometric" is a substantially stable physical characteristic of a person which can be measured and characterized for comparison purposes. Examples of biometrics include fingerprint recognition, hand geometry or print recognition, iris recognition, face recognition, and speech or voice recognition. It should be appreciated that biometrics may also include behavioral characteristics such as the manner in which a person writes his or her signature.

As shall be discussed below in more detail, the biometric sensing device 16 may be utilized to verify identity of a user for the purpose of controlling sale of restricted items. What is meant herein by the term "restricted item" is an item that can only properly be purchased if the customer meets a certain criterion required by the retailer, statute, local ordinance, or the like. Typically, the criterion which must be met by the customer involves the age of the customer. In particular, the customer generally must be of a minimum age in order to buy certain types of restricted items. Examples of restricted items include alcoholic beverages, tobacco products, and certain chemical solvents.

As shall be discussed below in greater detail, in order to control sale of such restricted items, the retailer may encode the customer's age onto his or her loyalty card or smart card in order to determine if the customer is of the requisite age to purchase the restricted item. Moreover, the retailer may also maintain a database which includes the age of known customers such that the customer's age does not have to be stored on his or her loyalty or smart card. In such a configuration, when the customer identifies himself or herself by inserting his or her smart card, loyalty card, debit card, or credit card into the card reader 30 such that a user reported identity code is read therefrom, the customer's age may be retrieved from the database in order to determine if the customer is of the requisite age to purchase the restricted item. What is meant herein by the term "user reported identity code" is a unique code associated with each customer which the customer enters into the self-service checkout terminal 10 in an effort to identify himself or herself. It should be appreciated that the user reported identity code may be a unique alphanumeric code assigned by the retailer and encoded on the customer's loyalty or smart card. Moreover, the user reported identity code may be the customer's account number stored on his or her credit or debit card. Hence, it should be appreciated that the user reported identity code may be entered into the self-service checkout terminal 10 in a number of manners. For example, as described above, the customer's user reported identity code may be read from the customer's smart card, loyalty card, debit card, or credit card via the card reader 30. Moreover, the customer's user reported identity code may be manually entered via the touch screen of the display monitor 32 or the keypad 34.

It should be appreciated that it is desirable to prevent a given customer from utilizing the user reported identity code associated with a different customer to commit improprieties such as purchasing restricted items which he or she does not meet the criterion (e.g. the requisite age) to purchase. For example, it is desirable to prevent an underage customer from purchasing beer by using a loyalty card which belongs to a customer which is of the requisite age to purchase the beer. Hence, the biometric sensing device 16 is provided to prevent such improprieties. In particular, as shall be discussed below in greater detail, a database may be maintained which includes a user biometric profile for each known customer. Such a user biometric profile includes a recognition profile associated with a particular biometric characteristic of the customer. For example, if the biometric sensing device 16 of a given self-service. checkout terminal 10 is embodied as a facial recognition device, the user biometric profile associated with a given customer includes a face recognition profile. Hence, when a customer enters a restricted item into the self-service checkout terminal 10, the customer's age may be ascertained in the manner described above. Thereafter, assuming the customer is of the age required to purchase the particular restricted item, the biometric sensing device 16 may be utilized to confirm the identity of the customer. More specifically, the biometric sensing device 16 may be utilized to confirm that the person purchasing the restricted item is actually the same person to which the user reported identity code is assigned thereby preventing improper sale of the restricted item.

The self-service checkout terminal 10 also includes a bagwell 38 for accommodating one or more grocery bags (not shown), a base 40 having a counter 42 secured thereto, and a basket shelf 44. The counter 42 defines an arcuate surface as shown in FIG. 1. Such an arcuate surface allows the scanner 14 to be positioned relatively close or otherwise proximate the ATM 24 and hence the components associated therewith. Such a configuration facilitates a customer's use of the self-service checkout terminal 10. Moreover, the bagwell 38 is configured to allow two or more grocery bags to be accessed by the customer at any given time thereby allowing a customer to selectively load various item types into the grocery bags. For example, the customer may desire to use a first grocery bag for household chemical items such as soap or bleach, and a second grocery bag for edible items such as meat and produce.

The scanner 14 conventionally scans or reads a product identification code such as a Universal Product Code (UPC), industrial symbol(s), alphanumeric character(s), or other indicia associated with an item to be purchased. One scanner which may be used in the present invention is a model number 7875 bi-optic scanner which is commercially available from NCR Corporation of Dayton, Ohio.

The scanner 14 includes a first scanning window 14a and a second scanning window 14b. The first scanning window 14a is disposed in a substantially horizontal manner, whereas the second scanning window 14b is disposed in a substantially vertical manner, as shown in FIG. 1. The product scale 12 is integrated with the scanner 14. More specifically, the product scale 12 is disposed substantially parallel to the scanning window 14a thereby enveloping the scanning window 14a. If an item such as produce is placed upon the product scale 12 or the first scanning window 14a, the product scale 12 may be used to determine the weight of the item.

The scanner 14 also includes a light source (not shown) such as a laser, a rotating mirror (not shown) driven by a motor (not shown), and a mirror array (not shown). In operation, a laser beam reflects off the rotating mirror and mirror array to produce a pattern of scanning light beams. As the product identification code on an item is passed over the scanner 14, the scanning light beams scatter off the code and are returned to the scanner 14 where they are collected and detected. The reflected light is then analyzed electronically in order to determine whether the reflected light contains a valid product identification code pattern. If a valid code pattern is present, the product identification code is then converted into pricing information which is then used to determine the cost of the item in a known manner.

The display monitor 32 displays instructions which serve to guide a customer through a checkout procedure. For example, an instruction is displayed on the display monitor 32 which instructs the customer to enter an item into the self-service checkout terminal 10 by either passing the item over the scanner 14, or placing the item on the product scale 12 in order to obtain the weight of the item. The display monitor 32 is preferably a known touch screen monitor which can generate data signals when certain areas of the screen are touched by a customer.

The status light device 11 is provided in order to notify store personnel, such as a customer service manager, that intervention into the customer's transaction is needed. In particular, the status light device 11 may display a first colored light in order to notify store personnel that intervention is needed prior to the end of the customer's transaction. Alternatively, the status light device 11 may display a second colored light in order to notify store personnel that intervention is needed immediately.

Figure 2:
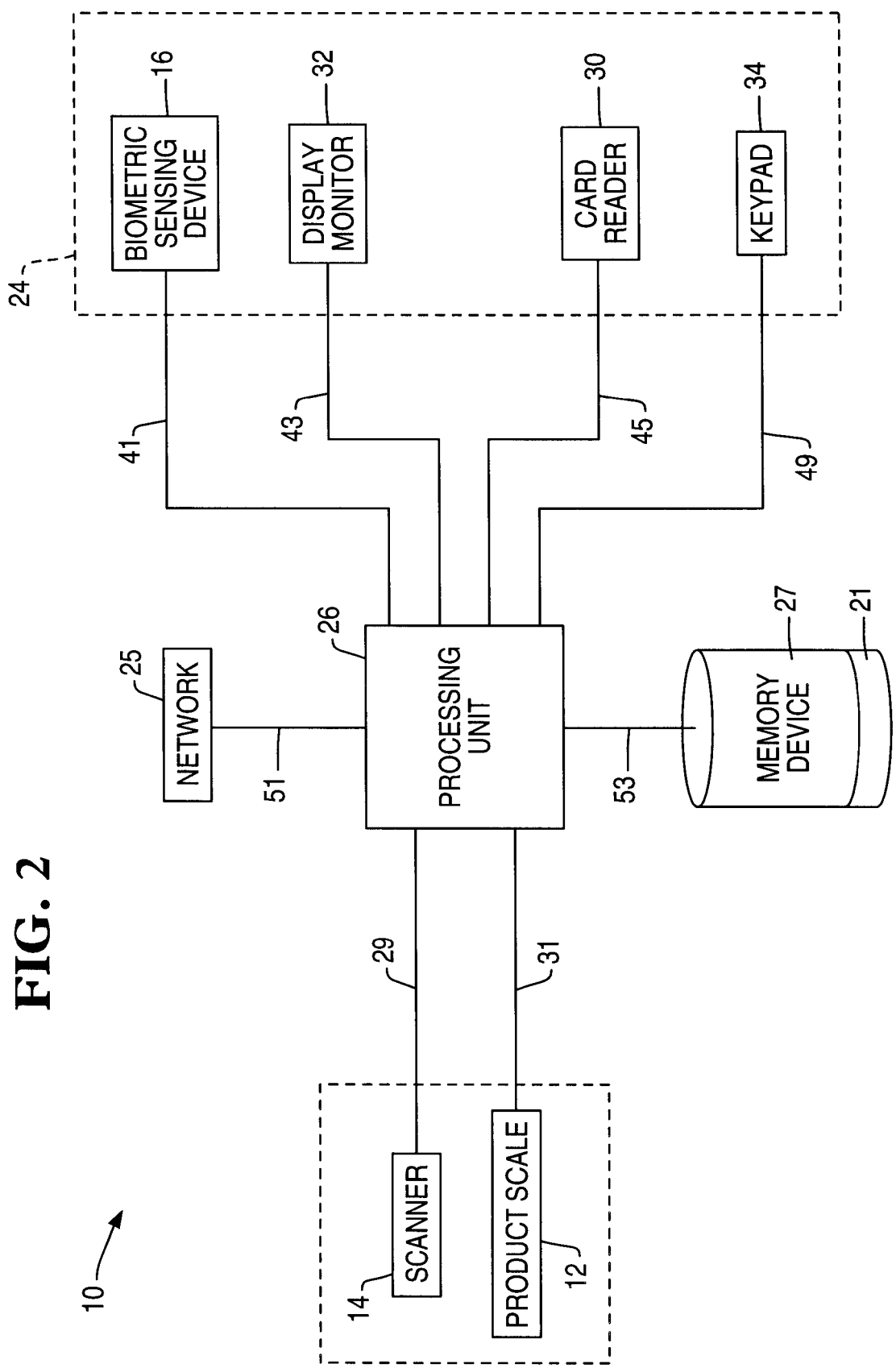
FIG. 2 is a simplified block diagram of the self-service checkout terminal of FIG. 1.

Referring now to FIG. 2, there is shown a simplified block diagram of the self-service checkout terminal 10. The processing unit 26 is electrically coupled to the product scale 12, the scanner 14, the biometric sensing device 16, the card reader 30, the display monitor 32, and the keypad 34. The processing unit 26 is also electrically coupled to a network 25 and a memory device 27.

The processing unit 26 monitors output signals generated by the scanner 14 via a communication line 29. In particular, when the customer scans an item or a coupon which includes a bar code across the scanning windows 14a, 14b, an output signal is generated on the communication line 29.

The processing unit 26 is coupled to the product scale 12 via a data communication line 31. In particular, when an item is placed thereon, the product scale 12 generates an output signal on the data communication line 31 indicative of the weight of the item.

The processing unit 26 communicates with the biometric sensing device 16 via a communication line 41. As discussed above, the biometric sensing device 16 is provided to detect a biometric characteristic associated with a customer in order to confirm identity of the customer. Hence, the processing unit 26 monitors output signals on the communication line 41 in order to determine when the biometric sensing device 16 has captured or otherwise detected a biometric characteristic of the customer so that the captured biometric characteristic may be compared to a stored user biometric profile associated with the customer in order to verify identity of the customer.

The biometric sensing device 16 may be embodied as a facial recognition device for detecting a facial pattern associated with a customer's facial characteristics. Such a system typically includes a video system having a video camera (not shown) which captures an image of the customer during use of the self-service checkout terminal 10. Thereafter, the image may be digitized or otherwise formatted in order to be compared to a stored face recognition profile associated with the customer in order to verify identity of the customer. Any known facial recognition device may be used as the biometric sensing device 16 of the present invention. One such facial recognition device which is suitable for use as the biometric sensing device 16 of the present invention is a computer-based system operating software sold under the trademark "FaceIt" which is commercially available from Visionics Corporation of Jersey City, N.J.

The biometric sensing device 16 may also be embodied as a fingerprint recognition device for detecting a fingerprint pattern associated with a customer's fingerprints. Such a system typically includes an optical system having a light sensor (not shown) which captures a light pattern reflected from the customer's finger. Thereafter, the light pattern may be compared to a stored fingerprint recognition profile associated with the customer in order to verify identity of the customer. Any known fingerprint recognition device may be used as the biometric sensing device 16 of the present invention. One such fingerprint recognition device which is suitable for use as the biometric sensing device 16 of the present invention is the fingerprint recognition apparatus disclosed in U.S. Pat. No. 5,067,162 entitled "Method and Apparatus for Verifying Identity Using Image Correlation" which was issued on Nov. 19, 1991 to Driscoll, Jr. et al.

The biometric sensing device 16 may further be embodied as an iris recognition device for detecting an iris pattern associated with a customer's iris prints. Such a system typically includes an optical system having a light sensor (not shown) which captures a light pattern reflected from the customer's iris. Thereafter, the light pattern may be compared to a stored iris recognition profile associated with the customer in order to verify identity of the customer. Any known iris recognition device may be used as the biometric sensing device 16 of the present invention. One such iris recognition device which is suitable for use as the biometric sensing device 16 of the present invention is sold under the trademark "Sensar . . . Secure" and is commercially available from Sensar, Incorporated of Moorestown, N.J.

Moreover, the biometric sensing device 16 may be embodied as a hand recognition device for detecting a hand pattern associated with a customer's hand characteristics. Such a system typically includes a video system having a video camera (not shown) which captures an image of the customer's hand during use of the self-service checkout terminal 10. Thereafter, the image may be digitized or otherwise formatted in order to be compared to a stored hand recognition profile associated with the customer in order to verify identity of the customer. Any known hand recognition device may be used as the biometric sensing device 16 of the present invention. One such hand recognition device which is suitable for use as the biometric sensing device 16 of the present invention is the hand recognition apparatus disclosed in U.S. Pat. No. 5,483,601 entitled "Apparatus and Method for Biometric Identification Using Silhouette and Displacement Images of a Portion of a Person's Hand" which was issued on Jan. 9, 1996 to Faulkner.

Yet further, the biometric sensing device 16 may be embodied as a voice identification device for detecting a voice pattern or voiceprint associated with a customer's voice or speech characteristics. Such a system typically includes an audio system having a microphone (not shown) which captures a sampling of the customer's voice. Thereafter, the sampling may be formatted into an electronic file in order to be compared to a stored voice recognition profile associated with the customer in order to verify identity of the customer. Any known voice identification device may be used as the biometric sensing device 16 of the present invention. One such voice identification device which is suitable for use as the biometric sensing device 16 of the present invention is a computer-based system operating voiceprint software sold under the trademark "CITADEL GateKeeper" which is commercially available from iNTELiTRAK Technologies, Incorporated of Austin, Tex.

The processing unit 26 communicates with the display monitor 32 through a data communication line 43. The processing unit 26 generates output signals on the data communication line 43 which cause various instructional messages to be displayed on the display monitor 32. The display monitor 32 may include known touch screen technology which can generate output signals when the customer touches a particular area of the display screen associated with the display monitor 32. The signals generated by the display monitor 32 are transmitted to the processing unit 26 via the data communication line 43. It should be appreciated that the various instructional messages may also be communicated via other devices in addition to or in lieu of the display monitor 32. For example, instructional messages may be generated with a voice generating device (not shown) or an audible tone generating device (not shown).

The keypad 34 is coupled to the processing unit 26 through a data communication line 49. The keypad 34 may include one or more of a known keypad or a touch pad. Moreover, the card reader 30 is coupled to the processing unit through a data communication line 45. The card reader 30 may include a known credit, debit, loyalty, and/or smart card reader which is capable of reading a user reported identity code stored on the customer's card. It should be appreciated that the card reader 30, the display monitor 32, and the keypad 34 define input devices which may be utilized by a customer to input his or her user reported identity code. For example, the customer may enter his or her user reported identity code by inserting a loyalty, smart, debit, or credit card into the card reader 30 thereby allowing the card reader 30 to read the code from the customer's card. Moreover, the customer may manually enter his or her user reported identity code by use of the touch screen associated with the display monitor 32 or the keys associated with the keypad 34. It should be appreciated that numerous other types of input devices may also be used to allow the customer to enter his or her user reported identity code during operation of the self-service checkout terminal 10.

The processing unit 26 includes network interface circuitry (not shown) which conventionally permits the self-service checkout terminal 10 to communicate with the network 25 such as a LAN or WAN through a wired connection 51. The processing unit 26 communicates with the network 25 during the checkout procedure in order to obtain information such as pricing information associated with an item being scanned or otherwise entered, and also to verify customer credit approval when appropriate. The network interface circuitry associated with the self-service checkout terminal 10 may include a known Ethernet expansion card, and the wired connection 51 may include a known twisted-pair communication line. Alternatively, the network interface circuitry may support wireless communications with the network 25.

The processing unit 26 communicates with the memory device 27 via a data communication line 53. The memory device 27 is provided to maintain a number of databases associated with operation of the self-service checkout terminal 10. For example, the memory device maintains an electronic transaction table which includes a record of the product information associated with each item that is scanned, weighed, or otherwise entered during the customer's use of the self-service checkout terminal 10. For example, if the customer scans a can of soup, the description of the soup and the pricing information associated therewith is recorded in the transaction table in the memory device 27. Similarly, if the customer weighs a watermelon with the product scale 12 and then enters a product lookup code associated with watermelon via the keypad 34, product information associated with the watermelon is recorded in the transaction table. Moreover, if a customer enters a coupon or voucher, the information associated therewith would also be recorded in the transaction table.

It should therefore be appreciated that the sum of each of the items recorded in the transaction table (1) minus any reductions (e.g. coupons), and (2) plus any applicable taxes is the amount that the customer pays for his or her transaction. Moreover, data stored in the transaction table is printed out on the printer 36 (see FIG. 1) thereby generating a receipt for the customer at the end of his or her transaction.

Moreover, the memory device 27 maintains a biometric database 21. The biometric database 21 includes a user biometric profile associated with each of the retailer's known customers. In particular, during issuance of a loyalty card or smart card, certain biometric characteristics of the customer may be obtained and stored in the biometric database 21 in a user biometric profile associated with the customer. For example, in the case of where the biometric sensing device 16 is embodied as a facial recognition device, a digital picture may be taken of the customer during issuance of the customer's loyalty or smart card. Thereafter, the digital picture may be formatted and stored in the biometric database 21 as a face recognition profile associated with the customer. Similarly, a fingerprint recognition profile, an iris recognition profile, a hand recognition profile, and/or a voice recognition profile associated with each known customer may also be stored in the biometric database 21 if the self-service checkout terminals associated with the retailer's operation are equipped with biometric sensing devices which utilize such profiles. It should be appreciated that such profiles may also be stored in the biometric database 21 so as to be retrieved in response to the customer identifying himself or herself via use of a debit or credit card.

It should be appreciated that the biometric database 21 may be maintained locally (i.e. at the retailer's store), regionally (i.e. within a group of stores in the same geographic region), or globally (i.e. at the retailer's headquarters so as to be accessible at any of the retailer's stores). Hence, access to user biometric profiles may be configured to fit the requirements of a given retailer.

Figure 3:
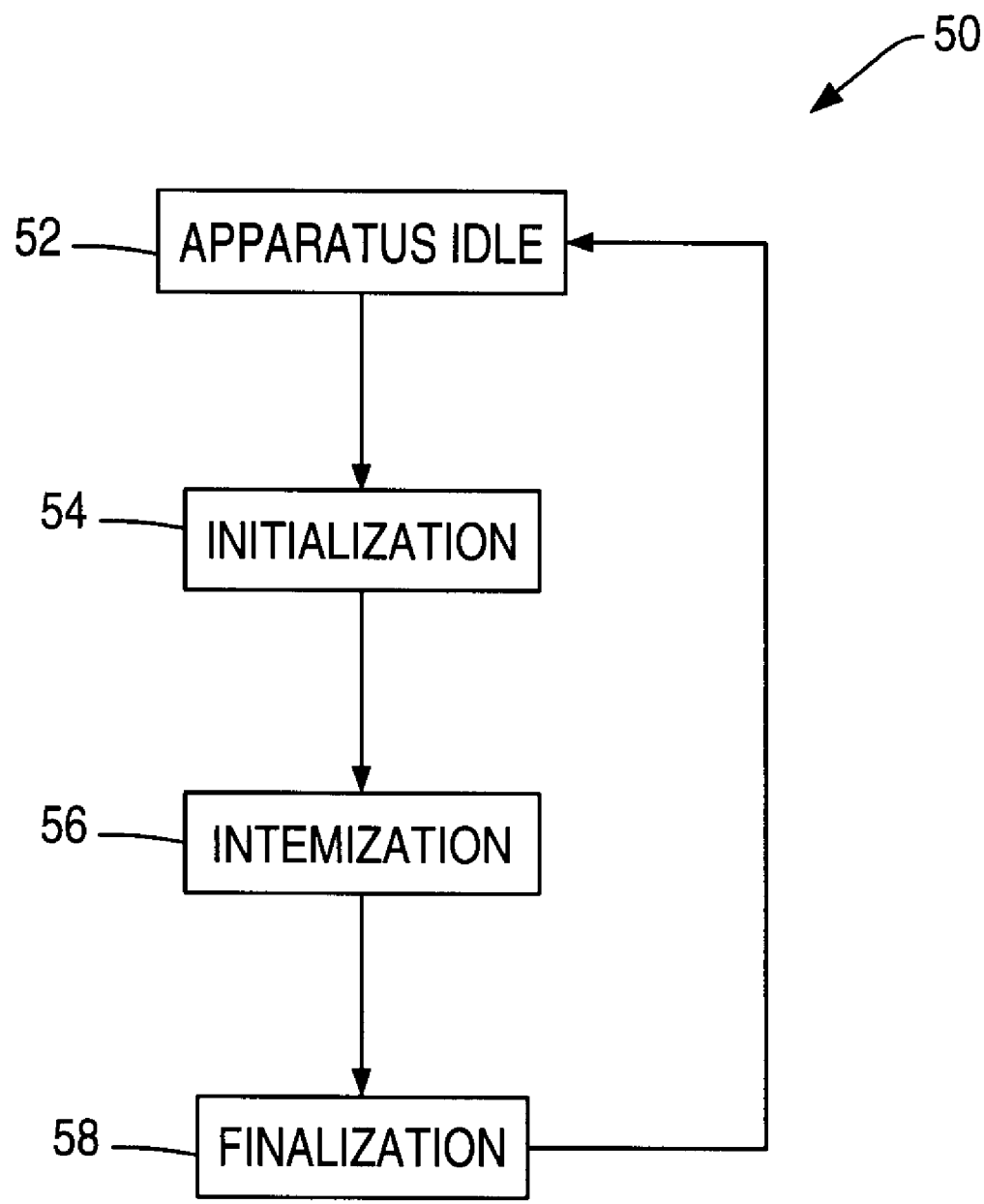
FIG. 3 is a flowchart setting forth a general procedure for checking out items through the self-service checkout terminal of FIG. 1.

Referring now to FIG. 3, there is shown a flowchart which sets forth a general procedure 50 for checking out items through the self-service checkout terminal 10. It should be appreciated that when the customer arrives at the self-service checkout terminal 10, the terminal 10 is in an idle state (step 52). An initialization step 54 is executed prior to checking out items for purchase. In particular, one or more initialization instructions are displayed on the display monitor 32 which instruct the customer to (1) touch a particular area of the display monitor 32 or push a particular button on the keypad 34 in order to select a desired method of payment, and/or (2) identify himself or herself by inserting a loyalty card, debit card, credit card, or smart card into the card reader 30.

At the completion of the initialization step 54, the routine 50 advances to an itemization step 56 where the customer enters individual items for purchase by scanning the items across the scanner 14. Moreover, in step 56 the customer enters items, such as produce items or the like, by weighing the items with the product scale 12, and thereafter entering a product lookup code associated with the item via either the keypad 34 or by touching a particular area of the display monitor 32. Further, in step 56 the customer may enter an item by manually entering the product identification code associated with the item via use of the keypad 34. Such manual entry of an item may be necessary for items which would otherwise be entered via the scanner 14 if the bar code printed on the item is not readable by the scanner 14. It should be appreciated that the self-service checkout terminal 10 may be configured such that the routine 50 allows experienced customers of the self-service checkout terminal 10 to bypass the initialization step 52 thereby advancing directly to the itemization step 56. In such a configuration, the experienced customer would begin the transaction by scanning or otherwise entering his or her first item for purchase.

At the completion of the itemization step 56, the routine 50 advances to a finalization step 58 in which (1) a grocery receipt is printed by the printer 36, and (2) payment is tendered by either inserting currency into a cash acceptor (not shown), charging a credit card or debit card account, or decreasing a value amount stored on a smart card via the card reader 30. It should be appreciated that in the case of when a customer inserts currency into the cash acceptor, the self-service checkout terminal 10 may provide change via a currency dispenser (not shown) and a coin dispenser (not shown). After completion of the finalization step 58, the routine 50 returns to step 52 in which the self-service service checkout terminal 10 remains in the idle condition until a subsequent customer initiates a checkout procedure.

Figure 4A:
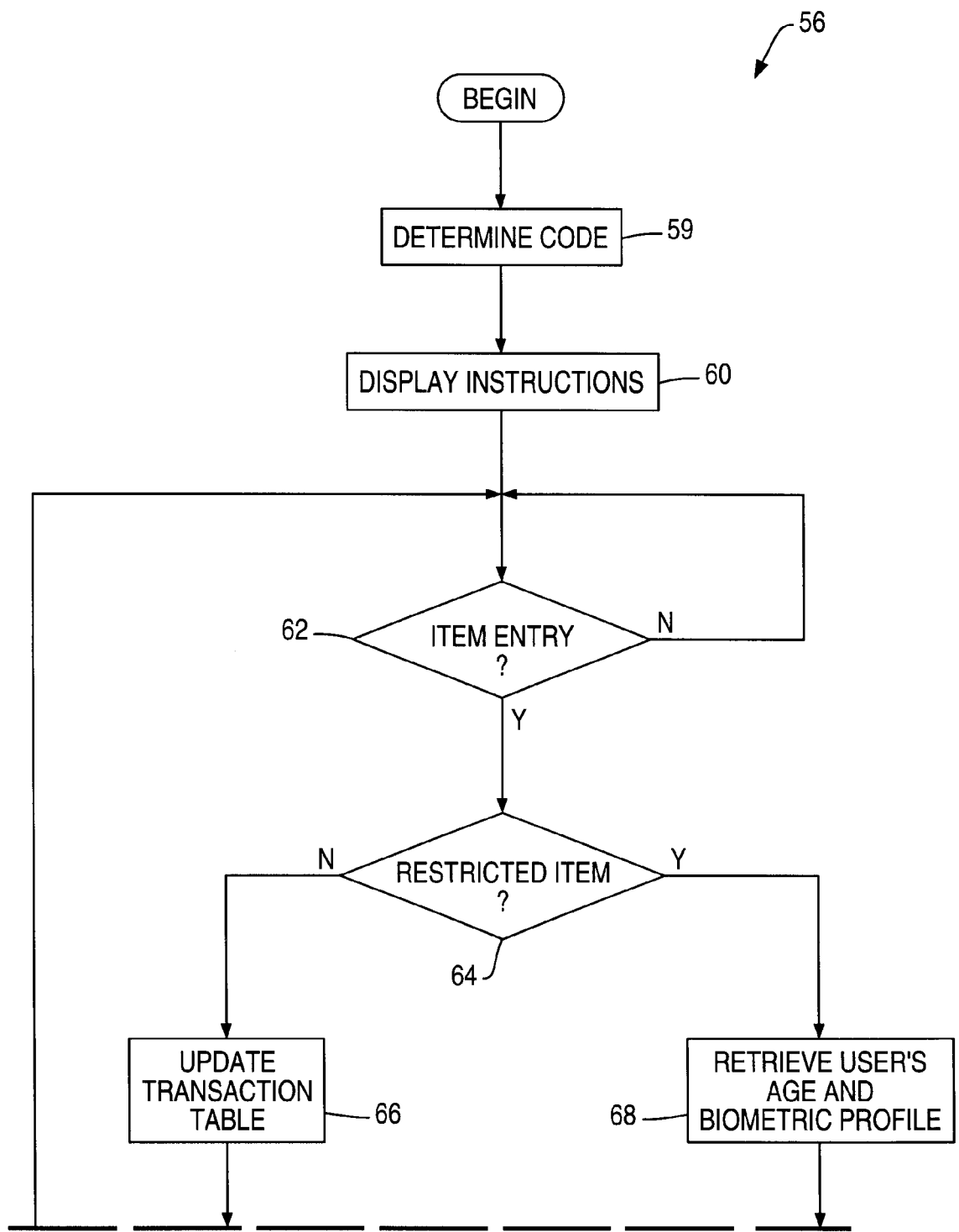
FIGS. 4A and 4B is a flowchart setting forth in more detail the itemization step of the general procedure of FIG. 3.
Figure 4B:
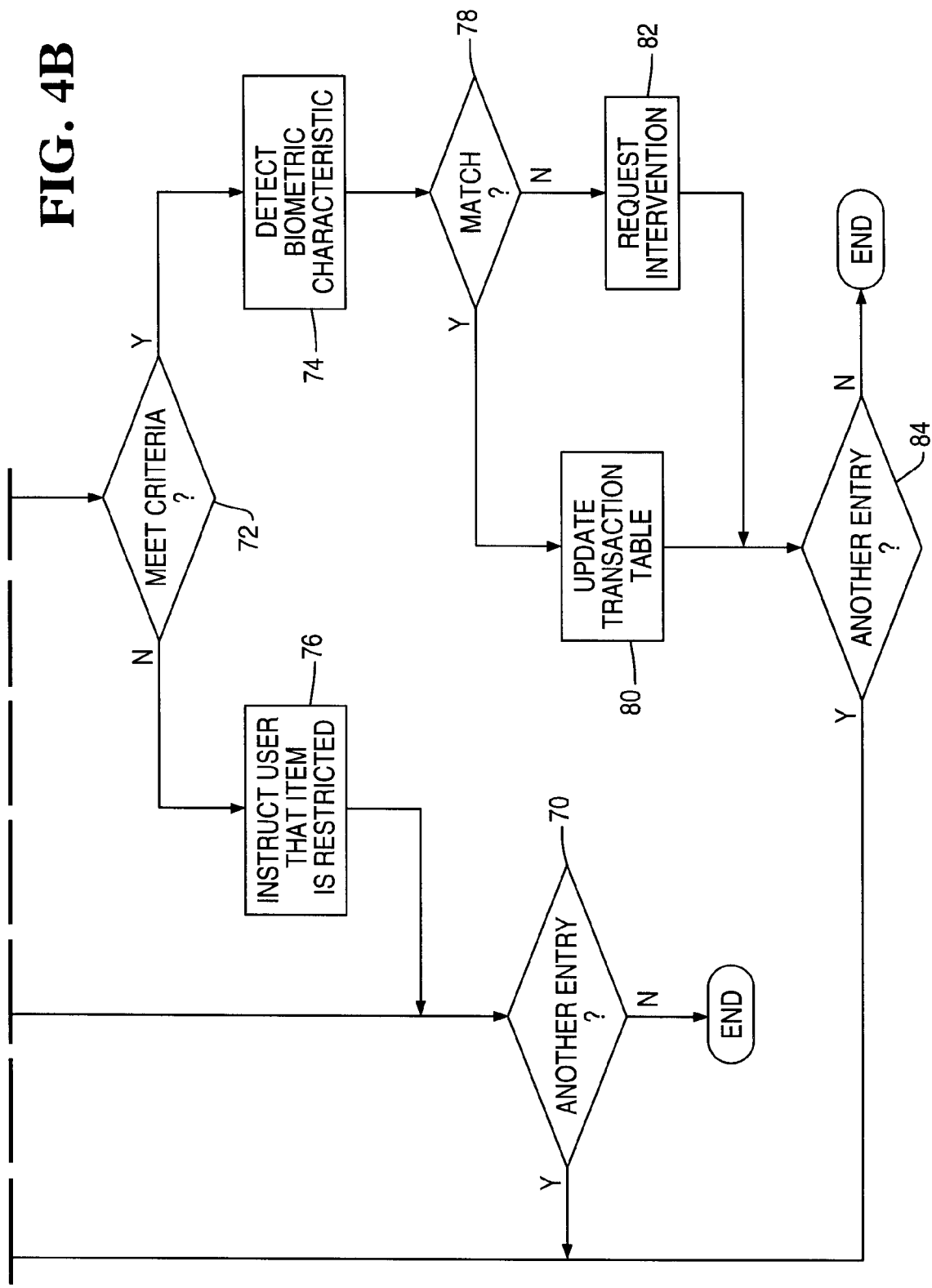

Referring now to FIG. 4, there is shown a flowchart setting forth the itemization step 56 in greater detail. After the initialization step 54 (see FIG. 3) is completed, the routine 56 advances to step 59 in which the processing unit 26 determines the user reported identity code associated with the customer. In particular, as discussed above, the customer may identify himself or herself by inputting his or her user reported identity code via one of the input devices associated with the self-service checkout terminal 10 (i.e. the card reader 30, the keypad 34, or the touch screen associated with the display monitor 32). As shall be discussed below, the user reported identity code may be utilized to retrieve information associated with the customer. Once the processing unit 26 has determined the user reported identity code associated with the customer, the routine 56 advances to step 60.

In step 60, a message is displayed on the display monitor 32 which instructs the customer to enter an item by either (1) passing or otherwise scanning individual items across or adjacent the scanner 14 with the bar code containing the item's product identification code facing the scanning windows 14a, 14b, or (2) placing an individual item on the product scale 12 in order to be weighed, or (3) manually entering the product identification code associated with an item with the keypad 34, or any combination thereof. The routine 56 then advances to step 62.

In step 62, the processing unit 26 determines whether an item has been entered into the self-service checkout terminal 10. In particular, the processing unit 26 determines if (1) the scanner 14 has successfully read or otherwise captured the product identification code associated with an item, (2) the product identification code associated with an item has been entered via the touch screen portion of the display monitor 32, or (3) the product identification code associated with an item has been entered via the keypad 34. More specifically, the scanner 14 generates an output signal which is sent to the processing unit 26 once the scanner 14 successfully reads the product identification code associated with the item. Similarly, the display monitor 32 and the keypad 34 generate an output signal which is sent to the processing unit 26 once the product identification code has been entered by the customer. If an item is successfully entered into the self-service checkout terminal 10, an item-entered control signal is generated and the routine 56 advances to step 64. If an item is not successfully entered into the self-service checkout terminal 10, the item-entered control signal is not generated, and the routine 56 loops back to monitor subsequent entry of an item.

In step 64, the processing unit 26 determines if the item that was entered is a restricted item. In particular, the processing unit 26 communicates with the memory device 27 in order to determine if the item entered is one of a number of restricted items. As discussed above, such restricted items can only be purchased if the customer meets a certain criterion, usually age, which required by the statute, ordinance, or the like. Examples of restricted items include alcoholic beverages, tobacco products, and certain chemical solvents. If the processing unit 26 determines that the item entered is a restricted item, a restricted-item control signal is generated and the routine 56 advances to step 68. If the processing unit 26 determines that the item entered is not a restricted item, the routine 56 advances to step 66.

In step 66, the processing unit 26 adds a record of the item entered in step 62 to a transaction table. In particular, the processing unit 26 communicates with the network 25 to obtain product information (e.g. description and price) associated with the entered item from a master product database. Thereafter, the processing unit 26 updates the transaction table. More specifically, the processing unit 26 generates an output signal which causes the transaction table to be updated to include the product information associated with the entered item. It should be appreciated that the contents of the transaction table are used by the self-service checkout terminal 10 for purposes of generating a grocery bill and receipt at the end of the transaction. The routine 56 then advances to step 70.

In step 70, the processing unit 26 monitors output from the keypad 34 and the display monitor 32 in order to determine whether there are more items to be entered. In particular, a message is displayed on the display monitor 32 instructing the customer to touch a particular touch screen area of the display monitor 32, or to touch a particular key associated with the keypad 34, when the customer has completed entering all of his or her items for purchase.

If a particular output is detected from either the keypad 34 or the display monitor 32, the processing unit 26 determines that the itemization step 56 is complete and the routine 56 then ends thereby advancing the routine 50 (see FIG. 3) to the finalization step 58 in order to allow the customer to tender payment for his or her items for purchase. If a particular output is not detected from either the keypad 34 or the display monitor 32, the processing unit 26 determines that the customer has additional items for purchase to be entered, and the routine 56 loops back to step 62 to monitor entry of subsequent items.

Returning now to step 64, if the item entered into the self-service checkout terminal 10 in step 62 is a restricted item, the routine 56 advances to step 68. In step 68, the processing unit 26 determines the customer's age and biometric characteristics. In particular, the processing unit 26 communicates with the memory device 27 in order to retrieve the customer's age and the customer's user biometric profile. It should be appreciated that the user reported identity code (as determined in step 59) is utilized to retrieve stored information corresponding to the customer. In particular, the user reported identity code is utilized to retrieve the customer's age from a database which includes the age of each of the retailer's known customers. Alternatively, as described above, the customer's age may be encoded on his or her loyalty or smart card thereby eliminating the need to maintain a database which includes such information. Similarly, the user reported identity code is utilized to retrieve the customer's user biometric profile from the biometric database 21.

As discussed above, the user biometric profile includes electronic files associated with stored biometric profiles of the customer. For example, in the case of where the biometric sensing device 16 is embodied as a facial recognition device, a face recognition profile associated with the customer may be retrieved from the biometric database 21. Similarly, a fingerprint recognition profile, an iris recognition profile, a hand recognition profile, and/or a voice recognition profile associated with the customer may also be retrieved from the biometric database 21 if the self-service checkout terminals associated with the retailer's operation are equipped with biometric sensing devices which utilize such profiles. Once the user biometric profile associated with the customer, along with the age of the customer, have been retrieved, the routine 56 advances to step 72.

It should be appreciated that in the case of a new customer (i.e. a customer which does not have a user biometric profile associated therewith in the biometric database 21), the self-service checkout terminal 10 may be configured to request customer intervention by a customer service manager via use of the status light device 11. Thereafter, a user biometric profile may be established for the customer in the manner previously discussed so as to prevent the need for intervention during subsequent visits to the retailer's store.

In step 72, the processing unit 26 determines if the customer meets the criterion required for purchase of the restricted item. In particular, the processing unit 26 retrieves from a master product database the criterion required for purchase of the restricted item. Thereafter, the processing unit 26 determines if the customer meets such a criterion. For example, if the customer scans or otherwise enters a case of beer into the self-service checkout terminal 10, the processing unit 26 retrieves the required criterion (e.g. 21 years of age) from the master product database. Thereafter, the processing unit 26 compares the customer's age (as determined in step 68) to the required criterion (e.g. 21 years of age). If the customer meets the criterion for purchase of the restricted item, the routine 56 advances to step 74. If the customer does not meet the required criterion, the routine advances to step 76.

In step 74, the processing unit 26 communicates with the biometric sensing device 16 so as to determine if the biometric sensing device 16 has captured or otherwise detected a biometric characteristic of the customer. As discussed above, the biometric sensing device 16 may be embodied as a facial recognition device for detecting a facial pattern associated with a customer's facial characteristics. Moreover, the biometric sensing device 16 may also be embodied as a fingerprint recognition device for detecting a fingerprint pattern associated with a customer's fingerprints. Alternatively, the biometric sensing device 16 may be embodied as an iris recognition device for detecting an iris pattern associated with a customer's iris prints. Yet further, the biometric sensing device 16 may be embodied as a hand recognition device for detecting a hand pattern associated with a customer's hand characteristics. In addition, the biometric sensing device 16 may be embodied as a voice identification device for detecting a voice pattern associated with a customer's voice or speech characteristics. Once the biometric sensing system 16 has captured or otherwise detected the appropriate biometric characteristic of the customer, the routine 56 advances to step 78.

In step 78, the processing unit determines if the detected biometric characteristic (as detected in step 74) matches the retrieved user biometric profile. What is meant herein by the terms "match" or "matches" is that the electronic file associated with a given user biometric profile is determined to be the same as or within a predetermined tolerance range of the electronic file associated with the detected biometric characteristic. It should be appreciated that if the detected biometric characteristic matches the retrieved user biometric profile, the processing unit 26 concludes that the person operating the self-service checkout terminal 10 is in fact the same person associated with the retrieved user biometric profile (i.e. the person identified on the loyalty card, smart card, or debit/credit card). Hence, in step 78, if the detected biometric characteristic matches the retrieved user biometric profile, the processing unit 26 concludes that the customer is permitted to purchase the restricted item, an identity-verified control signal is generated, and the routine 56 advances to step 80. If the detected biometric characteristic does not match the retrieved user biometric profile, the processing unit 26 concludes that the customer is not the same person associated with the retrieved user biometric profile (i.e. is not the same person identified on the loyalty card, smart card, or debit/credit card), a personnel control signal is generated, and the routine 56 advances to step 82.

In step 80, the processing unit 26 adds a record of the restricted item to the transaction table. In particular, the processing unit 26 communicates with the network 25 to obtain product information (e.g. description and price) associated with the restricted item from the master product database. Thereafter, the processing unit 26 updates the transaction table. More specifically, the processing unit 26 generates an output signal which causes the transaction table to be updated to include the product information associated with the restricted item. It should be appreciated that the contents of the transaction table are used by the self-service checkout terminal 10 for purposes of generating a grocery bill and receipt at the end of the transaction. The routine 56 then advances to step 84.

In step 84, the processing unit 26 monitors output from the keypad 34 and the display monitor 32 in order to determine whether there are more items to be entered. In particular, a message is displayed on the display monitor 32 instructing the customer to touch a particular touch screen area of the display monitor 32, or to touch a particular key associated with the keypad 34, when the customer has completed entering all of his or her items for purchase.

If a particular output is detected from either the keypad 34 or the display monitor 32, the processing unit 26 determines that the itemization step 56 is complete and the routine 56 then ends thereby advancing the routine 50 (see FIG. 3) to the finalization step 58 in order to allow the customer to tender payment for his or her items for purchase. If a particular output is not detected from either the keypad 34 or the display monitor 32, the processing unit 26 determines that the customer has additional items for purchase to be entered, and the routine 56 loops back to step 62 to monitor entry of subsequent items or coupons.

Returning now to step 78, if the detected biometric characteristic does not match the retrieved user biometric profile, the processing unit 26 concludes that the customer is not the same person associated with the retrieved user biometric profile (i.e. is not the same person identified on the loyalty card, smart card, or debit/credit card), a personnel control signal is generated, and the routine 56 advances to step 82. In step 82, the processing unit 26 requests intervention from store personnel. In particular, the processing unit 26 communicates with the network 25 which pages or otherwise summons the retailer's personnel to intervene in the customer's transaction. Moreover, as alluded to above, the self-service checkout terminal 10 may request intervention via use of the status light device 11. It should be appreciated that such a request for intervention by store personnel may be prioritized by the self-service checkout terminal 10. In particular, the self-service checkout terminal 10 may generate a first type of personnel control signal if intervention by store personnel is needed immediately thereby suspending the transaction until store personnel audits or otherwise investigates the customer's transaction. Alternatively, the self-service checkout terminal 10 may generate a second type of personnel control signal if intervention by store personnel is not required immediately. In the case in which intervention is not needed immediately, the customer is allowed to continue his or her transaction, but the transaction will not be completed until the intervention request is responded to by store personnel. The routine 56 then advances to step 84 in order to determine if the customer has additional items to be entered in the manner previously discussed.

Returning now to step 72, if the customer does not meet the required criterion for purchase of the restricted item (e.g. 21 years of age in regard to the purchase of beer), the routine advances to step 76. In step 76, a message is displayed on the display monitor 32 which instructs the customer that he or she is not permitted to purchase the restricted item. The routine 56 then advances to step 70 in order to determine if the customer has additional items to be entered in the manner previously discussed.

While the invention has been illustrated and described in detail in the drawings and foregoing description, such an illustration and description is to be considered as exemplary and not restrictive in character, it being understood that only the preferred embodiment has been shown and described and that all changes and modifications that come within the spirit of the invention are desired to be protected.

For example, although the retail terminal of the present invention has herein been described as being a self-service checkout terminal, and has significant advantages thereby in the present invention, it should be appreciated that other types of retail terminals are contemplated for use in the present invention. For example, the retail terminal may be an assisted retail terminal which is operated by a clerk or other employee of the retailer.

Moreover, the biometric sensing device 16 may be utilized for purposes other than control of the sale of restricted items. In particular, the self-service checkout terminal 10 may be configured to retrieve the user biometric profile associated with each customer and compare the same to a detected biometric characteristic irrespective of whether or not the customer enters a restricted item. Such operation of the self-service checkout terminal 10 may be desirable for security or marketing purposes in which it is desirable to confirm identity of the customer.

What is claimed is:

1. A method of operating a self-service checkout terminal, comprising the steps of:

determining a user reported identity code associated with a user of said checkout terminal and retrieving a user biometric profile which corresponds to said user reported identity code in response thereto;

detecting if said user enters a restricted item into said checkout terminal and generating a restricted-item control signal in response thereto;

detecting a biometric characteristic of said user in response to generation of said restricted-item control signal; and comparing said user biometric profile with said biometric characteristic and generating an identity-verified control signal if said user biometric profile matches said biometric characteristic.

2. The method of claim 1, further comprising the step of entering a record corresponding to said restricted item in a transaction table in response to generation of said identity-verified control signal.

3. The method of claim 1, further comprising the step of generating a personnel control signal if said biometric model does not match said biometric characteristic.

4. The method of claim 3, further comprising the step of suspending operation of said checkout terminal in response to generation of said personnel control signal.

5. The method of claim 1, wherein:

said user biometric profile includes a fingerprint recognition profile, said biometric characteristic detecting step includes the step of detecting a fingerprint pattern associated with said user's fingerprints, and said comparing step includes the step of comparing said fingerprint recognition profile to said fingerprint pattern and generating said identity-verified control signal if said fingerprint recognition profile matches said fingerprint pattern.

6. The method of claim 1, wherein:

said user biometric profile includes an iris recognition profile, said biometric characteristic detecting step includes the step of detecting an iris pattern associated with said user's iris prints, and said comparing step includes the step of comparing said iris recognition profile to said iris pattern and generating said identity-verified control signal if said iris recognition profile matches said iris pattern.

7. The method of claim 1, wherein:

said user biometric profile includes a face recognition profile, said biometric characteristic detecting step includes the step of detecting a facial pattern associated with said user's facial characteristics, and said comparing step includes the step of comparing said face recognition profile to said facial pattern and generating said identity-verified control signal if said face recognition profile matches said facial pattern.

8. The method of claim 1, wherein:

said user biometric profile includes a hand recognition profile, said biometric characteristic detecting step includes the step of detecting a hand pattern associated with said user's hand characteristics, and said comparing step includes the step of comparing said hand recognition profile to said hand pattern and generating said identity-verified control signal if said hand recognition profile matches said hand pattern.

9. The method of claim 1, wherein:

said user biometric profile includes a voice recognition profile, said biometric characteristic detecting step includes the step of detecting a voice pattern associated with said user's voice characteristics, and said comparing step includes the step of comparing said voice recognition profile to said voice pattern and generating said identity-verified control signal if said voice recognition profile matches said voice pattern.

10. A self-service checkout terminal, comprising:

an input device for receiving a user reported identity code associated with a user of said checkout terminal;

a biometric sensing device for detecting a biometric characteristic of said user;

a processing unit electrically coupled to both said input device and said biometric sensing device; and a memory device electrically coupled to said processing unit, wherein said memory device has stored therein a plurality of instructions which, when executed by said processing unit, causes said processing unit to:

(i) retrieve a user biometric profile which corresponds to said user reported identity code, (ii) detect if said user enters a restricted item into said checkout terminal and generate a restricted-item control signal in response thereto, and (iii) compare said user biometric profile with said biometric characteristic and generate an identity-verified control signal if said user biometric profile matches said biometric characteristic.

11. The self-service checkout terminal of claim 10, wherein said plurality of instructions, when executed by said processing unit, further causes said processing unit to enter a record corresponding to said restricted item in a transaction table in response to generation of said identity-verified control signal.

12. The self-service checkout terminal of claim 10, wherein said plurality of instructions, when executed by said processing unit, further causes said processing unit to generate a personnel control signal if said biometric model does not match said biometric characteristic.

13. The self-service checkout terminal of claim 10, wherein said plurality of instructions, when executed by said processing unit, further causes said processing unit to suspend operation of said checkout terminal in response to generation of said personnel control signal.

14. The self-service checkout terminal of claim 10, wherein:

said biometric sensing device includes a fingerprint recognition device for detecting a fingerprint pattern associated with said user's fingerprints, said user biometric profile includes a fingerprint recognition profile, and said plurality of instructions, when executed by said processing unit, further causes said processing unit to compare said fingerprint recognition profile to said fingerprint pattern and generate said identity-verified control signal if said fingerprint recognition profile matches said fingerprint pattern.

15. The self-service checkout terminal of claim 10, wherein:

said biometric sensing device includes an iris recognition device for detecting an iris pattern associated with said user's iris prints, said user biometric profile includes an iris recognition profile, and said plurality of instructions, when executed by said processing unit, further causes said processing unit to compare said iris recognition profile to said iris pattern and generate said identity-verified control signal if said iris recognition profile matches said iris pattern.

16. The self-service checkout terminal of claim 10, wherein:

said biometric sensing device includes a facial recognition device for detecting a facial pattern associated with said user's facial characteristics, said user biometric profile includes a face recognition profile, and said plurality of instructions, when executed by said processing unit, further causes said processing unit to compare said face recognition profile to said facial pattern and generate said identity-verified control signal if said face recognition profile matches said facial pattern.

17. The self-service checkout terminal of claim 10, wherein:

said biometric sensing device includes a hand recognition device for detecting a hand pattern associated with said user's hand characteristics, said user biometric profile includes a hand recognition profile, and said plurality of instructions, when executed by said processing unit, further causes said processing unit to compare said hand recognition profile to said hand pattern and generate said identity-verified control signal if said hand recognition profile matches said hand pattern.

18. The self-service checkout terminal of claim 10, wherein:

said biometric sensing device includes a voice identification device for detecting a voice pattern associated with said user's voice characteristics, said user biometric profile includes a voice recognition profile, and said plurality of instructions, when executed by said processing unit, further causes said processing unit to compare said voice recognition profile to said voice pattern and generate said identity-verified control signal if said voice recognition profile matches said voice pattern.

19. A self-service checkout terminal, comprising:

a scanner for reading bar codes associated with a user's items for purchase;

a product scale for weighing a number of said user's items for purchase;

an input device for receiving a user reported identity code associated with said user;

a biometric sensing device for detecting a biometric characteristic of said user;

a processing unit electrically coupled to each of said scanner, said product scale, said input device, and said biometric sensing device; and a memory device electrically coupled to said processing unit, wherein said memory device has stored therein a plurality of instructions which, when executed by said processing unit, causes said processing unit to:

(i) retrieve a user biometric profile which corresponds to said user reported identity code, and (ii) compare said user biometric profile with said biometric characteristic and generate an identity-verified control signal if said user biometric profile matches said biometric characteristic.

20. The self-service checkout terminal of claim 19, wherein said plurality of instructions, when executed by said processing unit, further causes said processing unit to generate a personnel control signal if said biometric model does not match said biometric characteristic.

\* \* \* \* \*